United States Patent
Benavides et al.

(10) Patent No.: US 11,810,104 B1
(45) Date of Patent: Nov. 7, 2023

(54) METHOD AND SYSTEM FOR MANAGEMENT OF GAME TOKENS

(71) Applicants: Enrique Benavides, Ahome (MX); Joel Pedroche, Barcelona (ES); Yasin Hatibi, Barcelona (ES)

(72) Inventors: Enrique Benavides, Ahome (MX); Joel Pedroche, Barcelona (ES); Yasin Hatibi, Barcelona (ES)

(73) Assignee: Enrique Benavides, Los Mochis (MX)

( * ) Notice: Subject to any disclaimer, the term of this patent is extended or adjusted under 35 U.S.C. 154(b) by 0 days.

(21) Appl. No.: 17/747,004

(22) Filed: May 18, 2022

(51) Int. Cl.
 *G06Q 20/36* (2012.01)
 *G06Q 20/38* (2012.01)
 *G06Q 20/40* (2012.01)
(52) U.S. Cl.
 CPC ....... *G06Q 20/3672* (2013.01); *G06Q 20/389* (2013.01); *G06Q 20/4014* (2013.01); *G06Q 20/4037* (2013.01)
(58) Field of Classification Search
 CPC .............. G06Q 20/36–3678; G06Q 20/389
 See application file for complete search history.

(56) References Cited

U.S. PATENT DOCUMENTS

| | | | |
|---|---|---|---|
| 8,601,372 B1* | 12/2013 | Gentile | G11B 27/034 715/202 |
| 11,374,756 B1* | 6/2022 | Myers | H04L 9/0819 |
| 2020/0042989 A1* | 2/2020 | Ramadoss | G06Q 20/065 |
| 2022/0058633 A1* | 2/2022 | Yantis | G06Q 20/3676 |

* cited by examiner

*Primary Examiner* — Jay Huang
(74) *Attorney, Agent, or Firm* — Michael D. Eisenberg

(57) ABSTRACT

An example token management operation may include one or more of receiving, by a token manager node, a registration request containing user IP address and a wallet from an at least one player node off-chain; mapping, by the token manager node, a transaction over the blockchain network with users' database based on the IP address; assigning, by the token manager node, a user role to the wallet, wherein the user role allows the at least one player node to buy game tokens from a liquidity pool over the blockchain network; executing, by the token manager node, a smart contract to add a safe balance to the at least one player node based on the user role; intercepting, by the token manager node, a transaction for selling at least one game token to a target player node to validate the safe balance of the player node; and allowing the transaction responsive to a validation.

20 Claims, 14 Drawing Sheets

500

METHOD AND SYSTEM FOR MANAGEMENT OF GAME TOKENS

BACKGROUND

This application generally relates to digital tokens, and more particularly, to management of token assets in blockchain networks based on user roles.

Currently, blockchain is a decentralized and open system without a central regulation of certification authority. The blockchain technology has been adopted for the trading of NFTs. NFT stands for a "non-fungible token," and it can technically contain anything in a form of a game tokens, digital images or items in video games. Conventional NFTs allow you to buy and sell ownership of unique digital items (e.g., game tokens) and keep track of who owns them using the blockchain.

Everyone can create ("mint") a game token as a blockchain asset, without having to prove their ownership. The current authentication mechanisms suggested by the largest NFT blockchain provider Ethereum™ itself and by major trading platforms like OpenSea work only ex-post, to prove ownership after the NFT has been illegally minted and if discovered by the owners. The existing platforms are not able to prevent theft and sales of tokens that are illegally minted.

As such, what is needed is a blockchain-based solution that may be used for management of game tokens on the blockchain to prevent the sale of the game tokens by unauthorized users based on a user role.

SUMMARY

One example embodiment provides a system that includes a processor and memory, wherein the processor of a token processing node is configured to: receive a registration request containing user IP address and a wallet from an at least one player node off-chain; map a transaction over the blockchain network with users' database based on the IP address; assign a user role to the wallet, wherein the user role allows the at least one player node to buy game tokens from a liquidity pool over the blockchain network; execute a smart contract to add a safe balance to the at least one player node based on the user role; intercept a transaction for selling at least one game token to a target player node to validate the safe balance of the player node; and allow the transaction responsive to a validation.

Another example embodiment provides a method that includes one or more of receiving, by a token manager node, a registration request containing user IP address and a wallet from an at least one player node off-chain; mapping, by the token manager node, a transaction over the blockchain network with users' database based on the IP address; assigning, by the token manager node, a user role to the wallet, wherein the user role allows the at least one player node to buy game tokens from a liquidity pool over the blockchain network; executing, by the token manager node, a smart contract to add a safe balance to the at least one player node based on the user role; intercepting, by the token manager node, a transaction for selling at least one game token to a target player node to validate the safe balance of the player node; and allowing the transaction responsive to a validation.

A further example embodiment provides a non-transitory computer readable medium comprising instructions, that when read by a processor, cause the processor to perform one or more of receiving a registration request containing user IP address and a wallet from an at least one player node off-chain; mapping a transaction over the blockchain network with users' database based on the IP address; assigning a user role to the wallet, wherein the user role allows the at least one player node to buy game tokens from a liquidity pool over the blockchain network; executing a smart contract to add a safe balance to the at least one player node based on the user role; intercepting a transaction for selling at least one game token to a target player node to validate the safe balance of the player node; and allowing the transaction responsive to a validation.

DETAILED DESCRIPTION

Figure 1A:
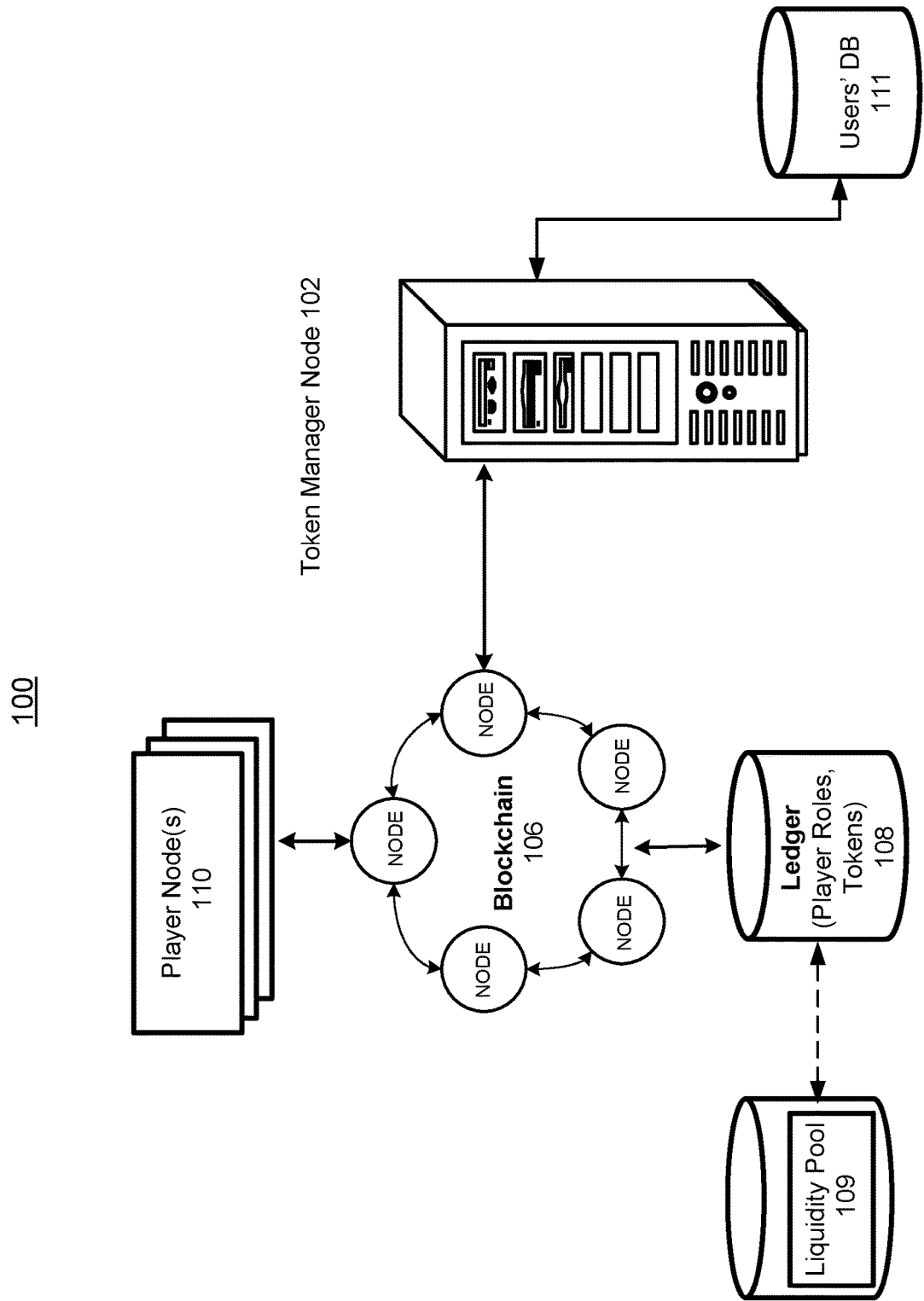
FIG. 1A illustrates a network diagram of a blockchain-based game system, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide for management of game tokens in blockchain networks.

In one embodiment the application utilizes a decentralized storage (such as a blockchain) that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the records and no single peer can modify the records without a consensus being reached among the distributed peers. For example, the peers may execute a consensus protocol to validate blockchain storage and token-related transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permissionless blockchain, anyone can participate without a specific identity. Public blockchains can involve native cryptocurrency and use consensus based on various protocols such as Proof of Work (PoW). On the other hand, a permissioned blockchain provides secure interactions among a group of entities which share a common goal such as buying and selling of game tokens, but which do not fully trust one another.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server or on different hosts. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of a node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a method and system for managing of assets such as game tokens in blockchain networks. The exemplary embodiments solve the issues of time and trust by extending features of a database such as immutability, digital signatures and being a single source of truth. The exemplary embodiments provide a solution for making transactions in cryptocurrency and game tokens over a blockchain-based network. The blockchain networks may be homogenous based on the asset type and rules that govern the assets based on the smart contracts.

Blockchain is different from a traditional database in that blockchain is not a central storage, but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system for management of buying and selling of game tokens using cryptocurrency in blockchain networks is implemented due to immutable accountability, security, privacy, permitted decentralization, availability of smart contracts, endorsements and accessibility that are inherent and unique to blockchain. In particular, the blockchain ledger data is immutable and that provides for efficient implementation of a method described herein. Also, use of the encryption in the blockchain provides security and builds trust. The smart contract manages the state of the asset to complete the life-cycle. The example blockchains are permission decentralized. Thus, each end user may have its own ledger copy to access. Multiple organizations (and peers) may be on-boarded on the blockchain network. The key organizations (e.g., a game token processing server) may serve as one of endorsing peers to validate the smart contract execution results, read-set and write-set. In other words, the blockchain inherent features provide for efficient implementation of the system and method described herein.

One of the benefits of the example embodiments is that it improves the functionality of a computing system by implementing a method for rewarding a game player and for making token-related transactions using blockchain-based systems. Through the blockchain system described herein, a computing system can perform functionality for transferring funds and game tokens in blockchain networks by providing access to capabilities such as distributed ledger, peers, encryption technologies, event handling, etc. Also, the blockchain enables to create a game network and make any users or players to on-board for participation. As such, the blockchain is not just a database. The blockchain comes with capabilities to create a Business Network (e.g., a game token exchange network) of users and on-board/off-board players to collaborate and execute service processes in the form of smart contracts.

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

Meanwhile, a traditional database could not be used to implement the example embodiments because it does not bring all parties on the charitable network, it does not create trusted collaboration and does not provide for an efficient storage and transfer of digital assets such as cryptocurrency. The traditional database does not provide for a tamper proof storage and does not provide for preservation of the digital assets being stored. Thus, the proposed method for game token management based on a blockchain network cannot be implemented in the traditional database.

Accordingly, the example embodiments provide for a specific solution to a problem in the arts/field of NFTs, game tokens and assets management. The example embodiments also change how data may be stored within a block structure of the blockchain. For example, a digital asset data may be securely stored within a certain portion of the data block (i.e., within header, data segment, or metadata). By storing the digital asset data within data blocks of a blockchain, the digital asset data may be appended to an immutable blockchain ledger through a hash-linked chain of blocks. In some embodiments, the data block may be different than a traditional data block by having game token owner role data associated with the digital asset not stored together with the assets within a traditional block structure of a blockchain. By removing the personal owner data associated with the digital asset, the blockchain can provide the benefit of anonymity based on immutable accountability and security.

According to the exemplary embodiments, a method system and computer readable media for management of the game tokens based on a user role are provided.

The exemplary embodiments provide for efficient control of selling the game tokens.

In one embodiment, a user (i.e., player) role is added so it can be assigned to the wallets that may be used to buy tokens from a liquidity provider. A liquidity pool has to be registered with the management platform. Once assigned, the user role cannot be revoked. Thus, the user may always able to redeem the tokens.

In another embodiment, a token sell protection is provided. In order for the user to sell the token the following conditions must be met:

Liquidity pool has to be registered;
User must have safe balance.

The safe balance is the balance of tokens that can be sold provided by approved smart contracts. This means that a player can only sell the token(s) provided by the game as rewards.

FIG. 1A illustrates a network diagram of a blockchain-based game system, according to example embodiments.

Referring to FIG. 1A, the example network 100 includes a token manager node 102 connected to other nodes (player nodes) 110 over blockchain network 106. The token manager node 102 may include additional components and that some of the components described herein may be removed and/or modified without departing from a scope of the token management node 102 disclosed herein.

According to the disclosed embodiments, the token manager node 102 may be connected to player nodes 110 over a blockchain network 106. The blockchain network 106 may have a ledger 108 that may store player roles and tokens. For a new user, an IP address and digital wallet may be verified off-chain. A user may send a registration request including email address and IP address via platform API off-chain. The platform API may send a confirmation code to the requestor's email so the new user can register using the confirmation code.

In one embodiment, a first-time user is registered automatically by registration method from the new-users-worker service that performs mapping of the transaction over the blockchain 106 with the users' database 111. In one embodiment, the token manager node 102 may assign a user role to the player node's 110 wallets that may be used to buy tokens from a liquidity pool 109. User's safe balance is set to "0"

on the blockchain ledger 108. At this point the registration of the user such as a user of a player node 110 is irrevocable on the blockchain network 106. The user is permitted by the token manager node 102 to buy the game tokens from a liquidity pool 109 on the blockchain network 106 based on the user role assigned to the wallets of the player node(s) 110.

In one embodiment, the token manager node 102 may implement game token sale protection steps as follows.

The token manager node 102 may execute a smart contract to add the safe balance to the player node 110 based on the user role. For example, the game may execute a smart contract to add safe balance of tokens so the user can sell these tokens later.

When the player node 110 executes a smart contract for the token sale transaction, the token manager node 102 may intercept this transaction to validate the safe balance of the player node 110. If the transaction amount exceeds the safe balance, the sell transaction is terminated. Note that transferring of the token reduces the safe balance, but it does not increase a target wallet's safe balance. Transferring balance to unregistered users is not allowed. The token manager node 102 may intercept the transaction and may check for registration of the target user.

Figure 1B:
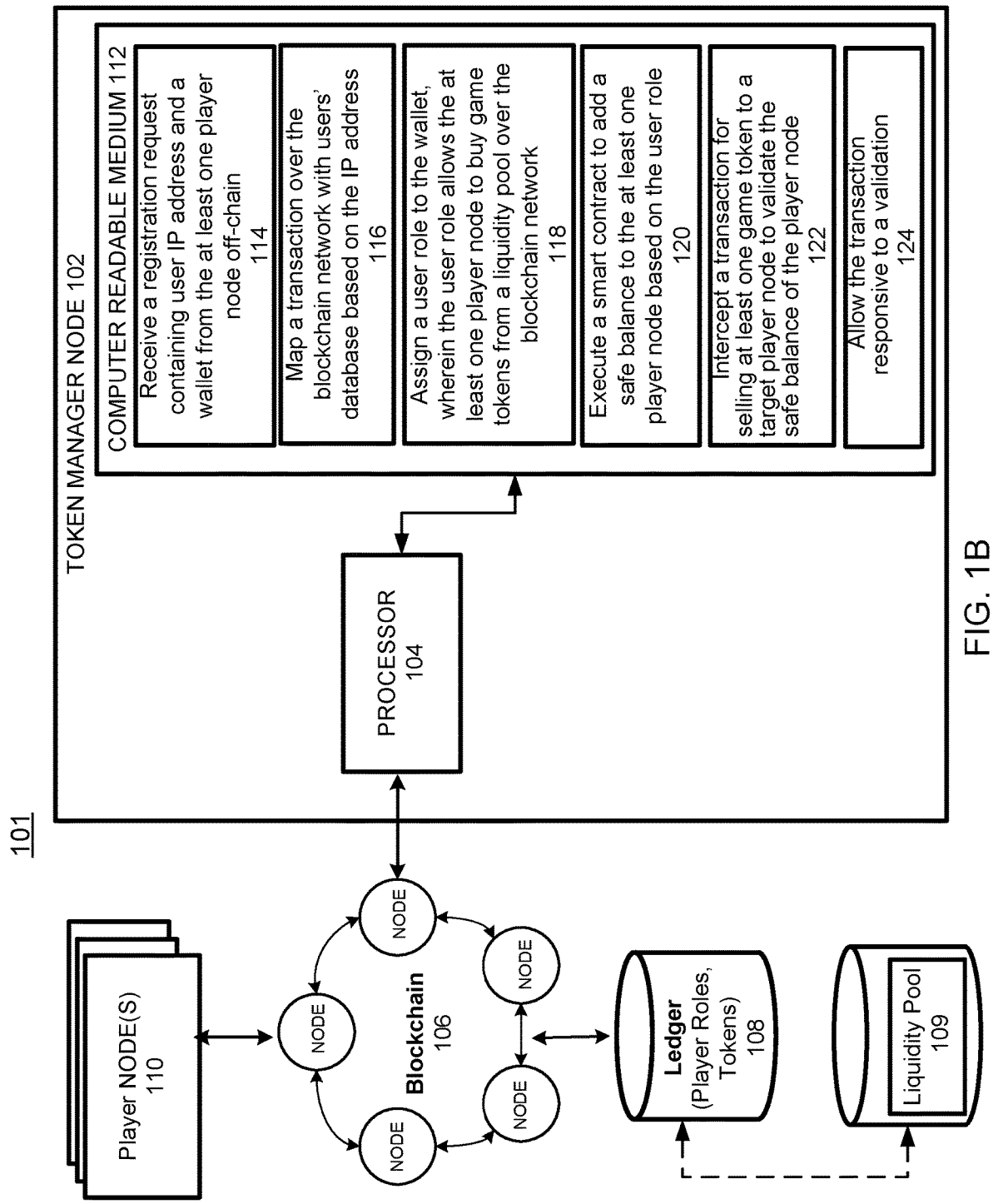
FIG. 1B illustrates a network diagram of a system including a detailed description of a game token processing node, according to example embodiments.

FIG. 1B illustrates a network diagram of a system including a detailed description of a game token processing node, according to example embodiments.

Referring to FIG. 1B, the example network 101 includes a token manager node 102 connected to player nodes 110 over blockchain network 106. The token manager node 102 may include additional components and that some of the components described herein may be removed and/or modified without departing from a scope of the token manager node 102 disclosed herein. The token manager node 102 may be a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the token manager node 102 may include multiple processors, multiple cores, or the like, without departing from the scope of the token manager node 102.

The token manager node 102 may also include a non-transitory computer readable medium 112 that may have stored thereon machine-readable instructions executable by the processor 104. Examples of the machine-readable instructions are shown as 114-124 and are further discussed below. Examples of the non-transitory computer readable medium 112 may include an electronic, magnetic, optical, or other physical storage device that contains or stores executable instructions. For example, the non-transitory computer readable medium 112 may be a Random-Access Memory (RAM), an Electrically Erasable Programmable Read-Only Memory (EEPROM), a hard disk, an optical disc, or other type of storage device.

A processor 104 may fetch, decode, and execute the machine-readable instructions 114 to receive a registration request containing user IP address and a wallet from the at least one player node 110 off-chain. The processor 104 may fetch, decode, and execute the machine-readable instructions 116 to map a transaction over the blockchain network 106 with users' database 111 (see FIG. 1A) based on the IP address. The processor 104 may fetch, decode, and execute the machine-readable instructions 118 to assign a user role to the wallet, wherein the user role allows the at least one player node 110 to buy game tokens from a liquidity pool 109 over the blockchain network 106.

The processor 104 may fetch, decode, and execute the machine-readable instructions 120 to execute a smart contract to add a safe balance to the at least one player node 110 based on the user role. The processor 104 may fetch, decode, and execute the machine-readable instructions 122 to intercept a transaction for selling at least one game token to a target player node to validate the safe balance of the player node. The processor 104 may fetch, decode, and execute the machine-readable instructions 124 to allow the transaction responsive to a validation.

Figure 2:
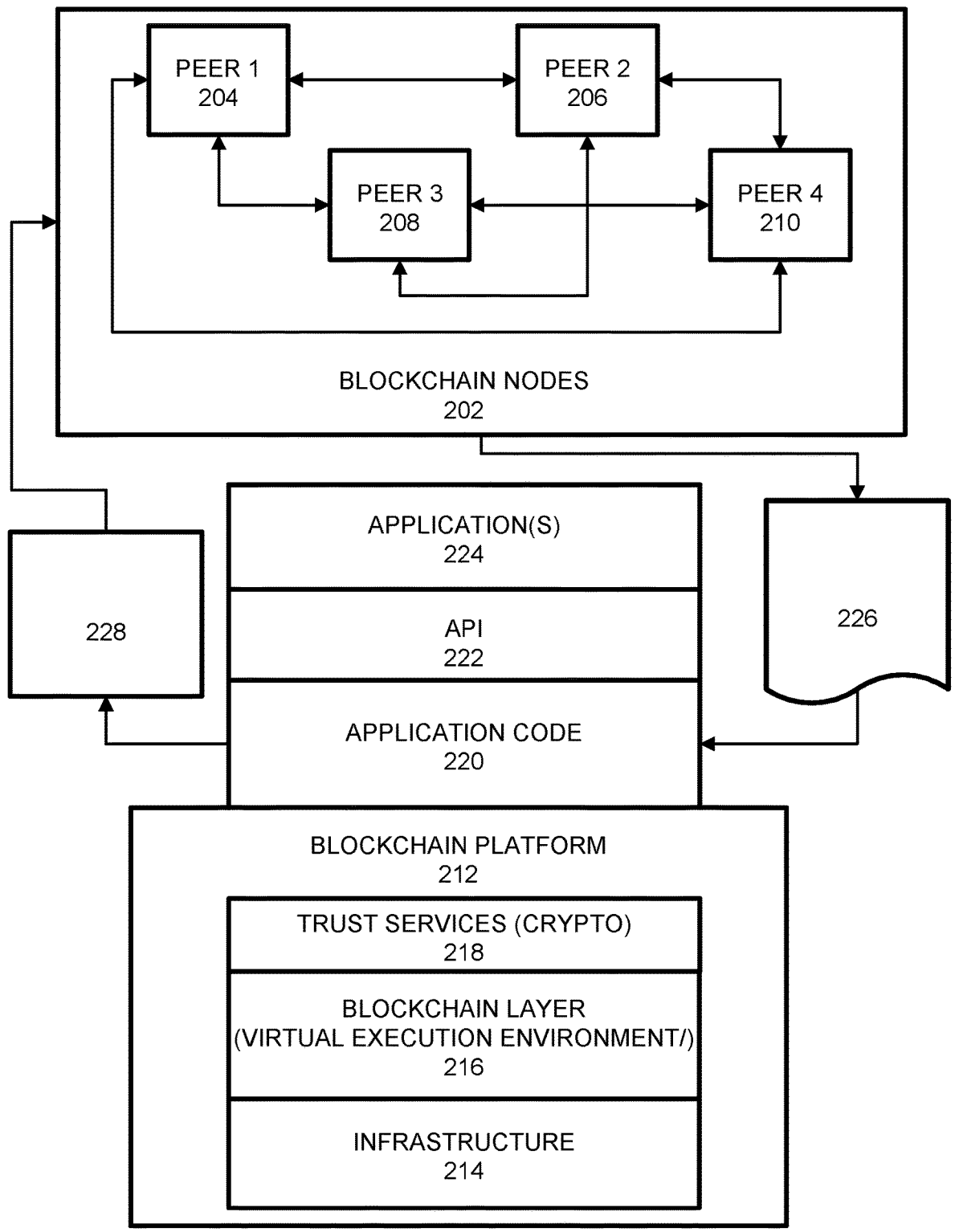
FIG. 2 illustrates an example blockchain architecture configuration, according to example embodiments.

FIG. 2 illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets such as NFTs. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 representing the NFT may be processed by one or more processing entities (e.g., virtual machines) included in the blockchain layer 216. The result 228 may include the NFT being transferred to a user. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in the blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 3A:
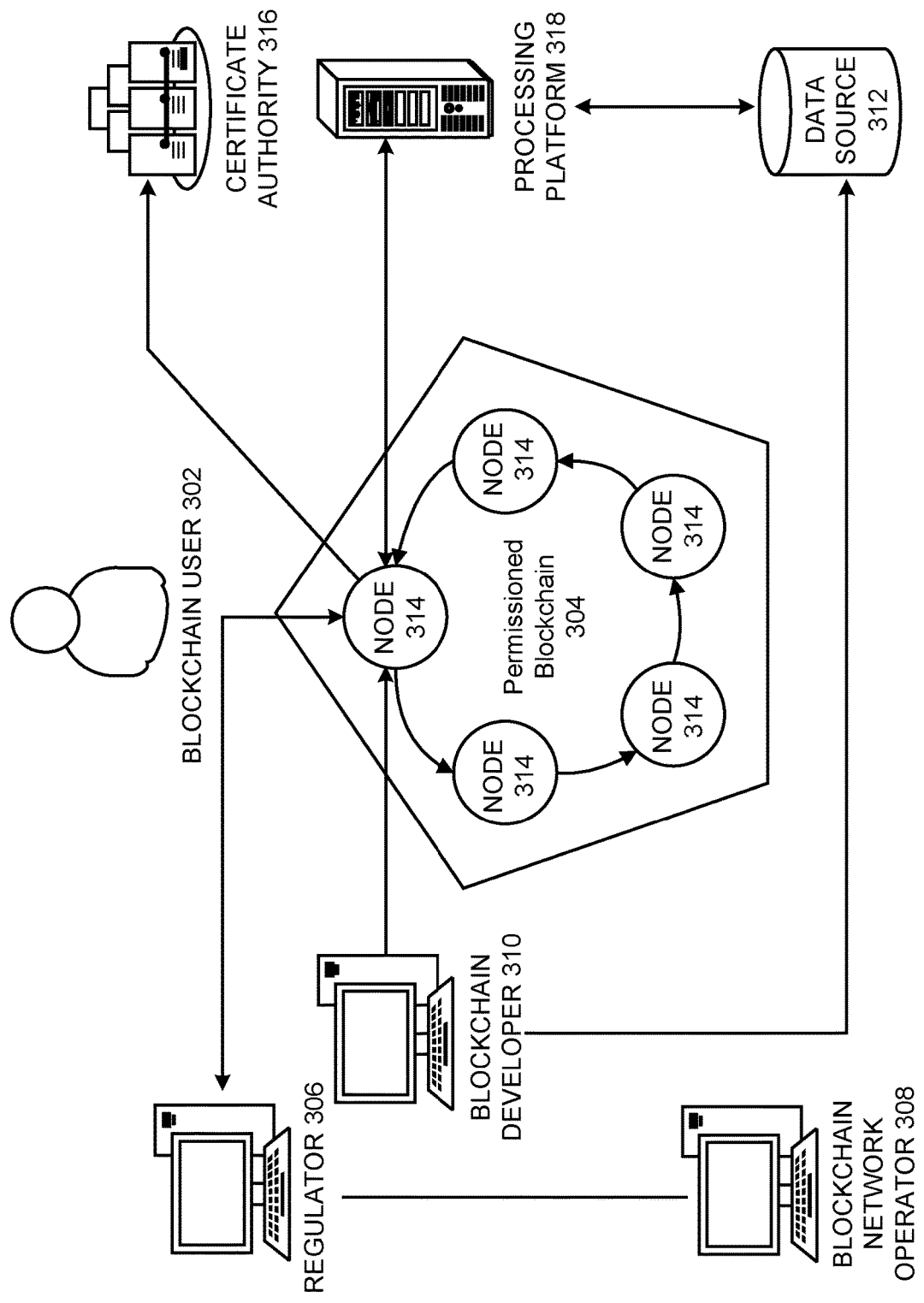
FIG. 3A illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client." An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
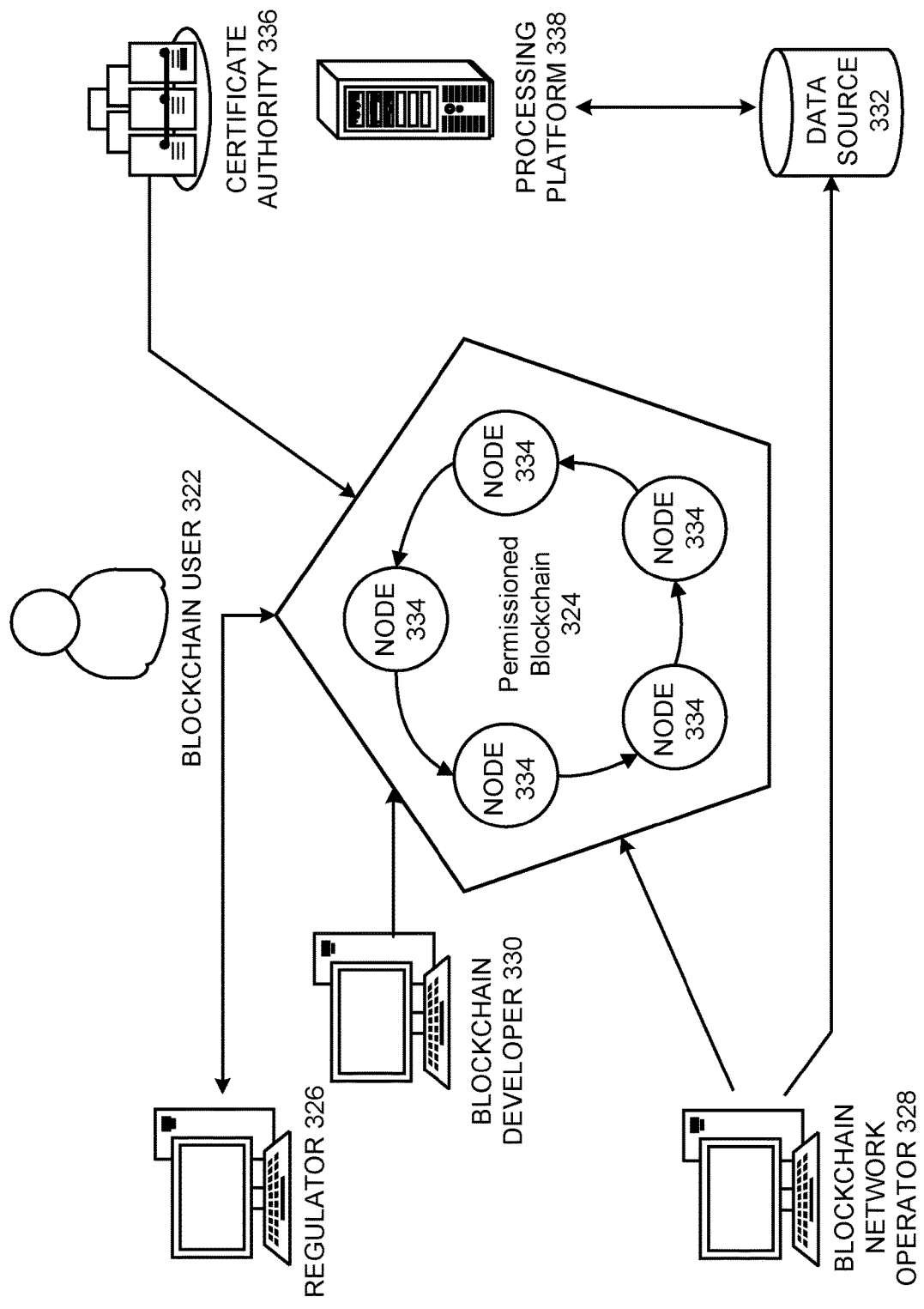
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client." An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
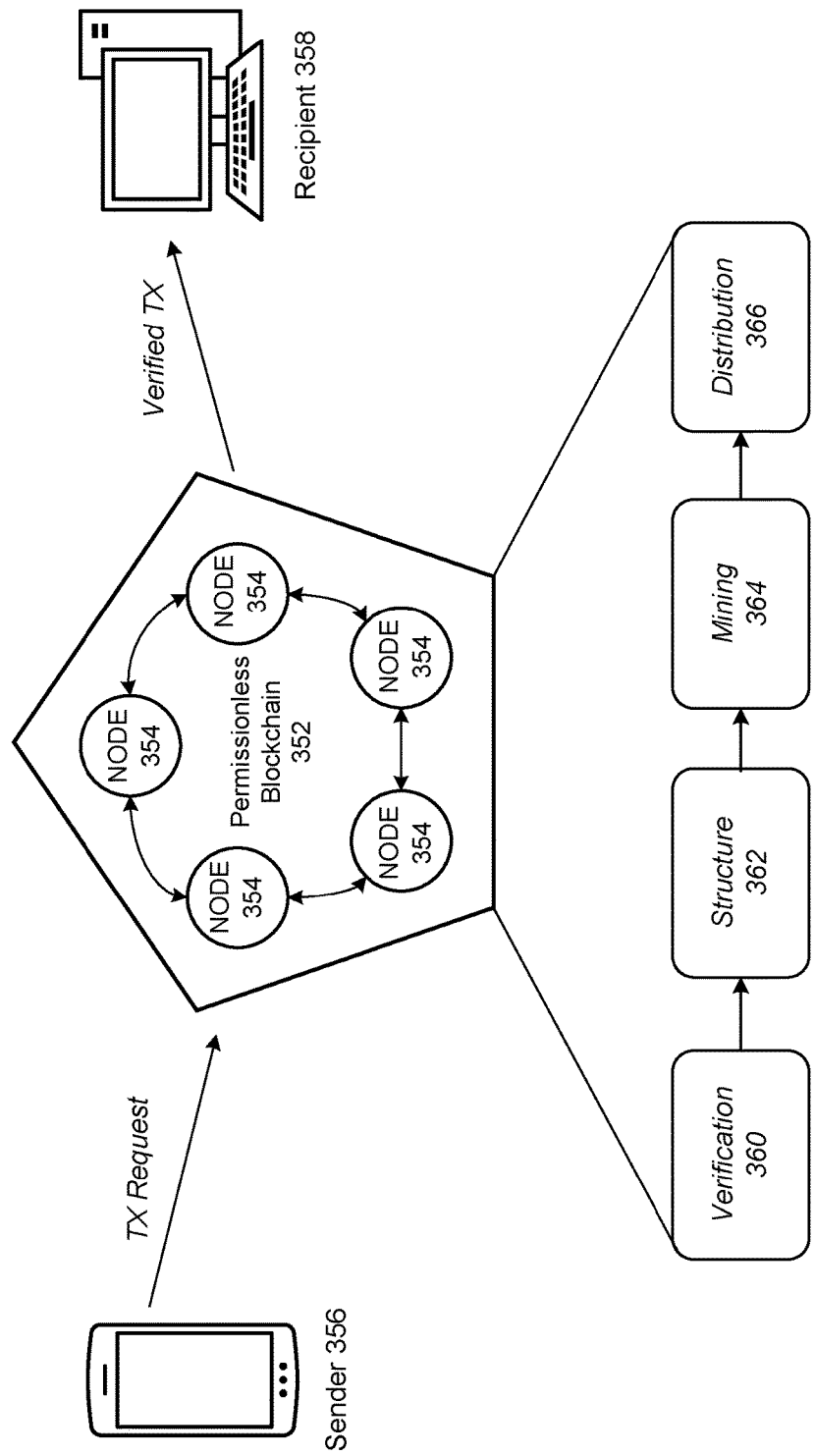
FIG. 3C illustrates a permissionless network, according to example embodiments.

FIG. 3C illustrates a process 350 of a transaction being processed by a permissionless blockchain 352 including a plurality of nodes 354. A sender 356 desires to send payment or some other form of value (e.g., NFTs or any other assets that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved (e.g., NFT owner, etc.). The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256-bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4A:
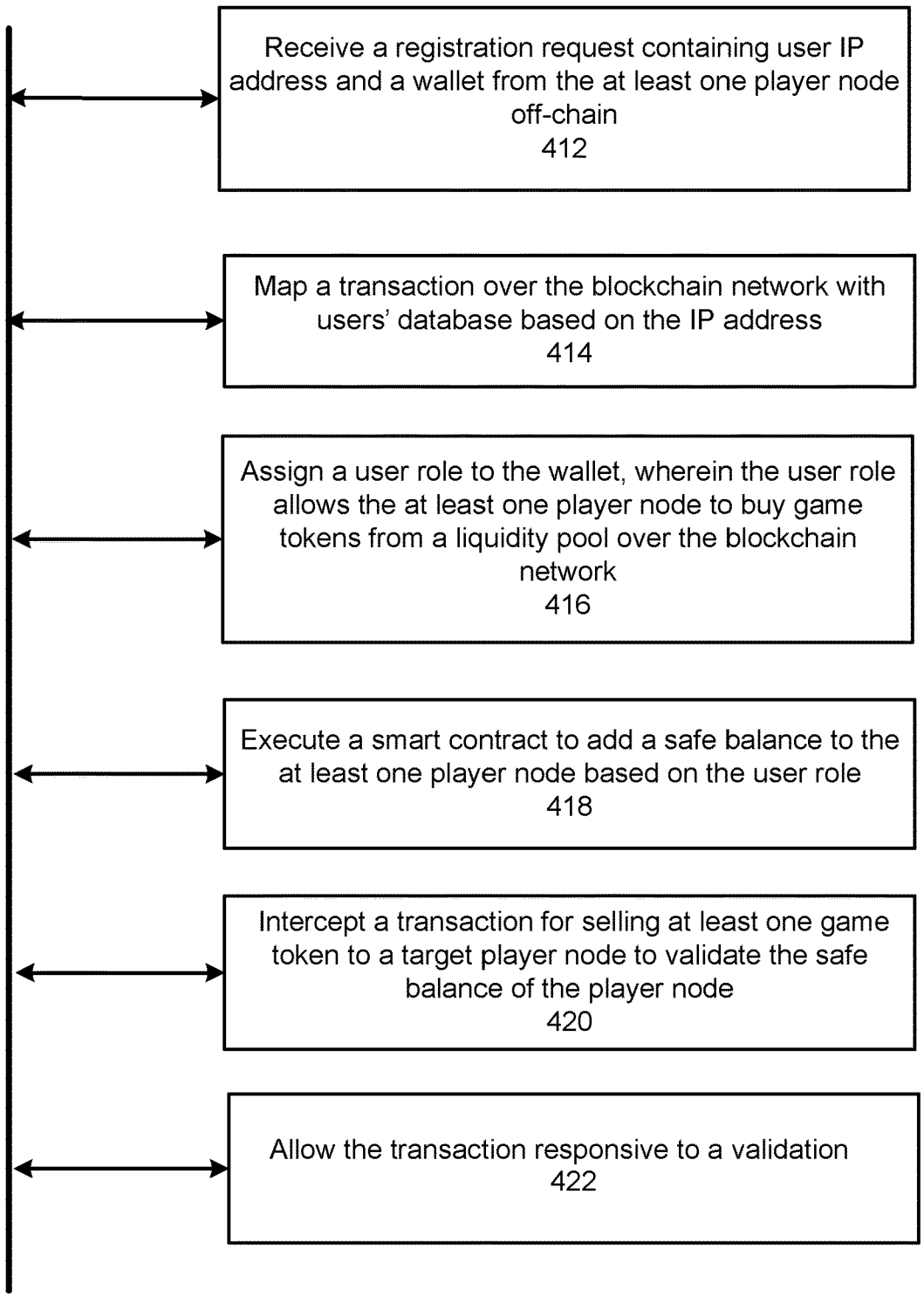
FIG. 4A illustrates a flow diagram of a method of token sale protection, according to example embodiments.

FIG. 4A illustrates a flow diagram 400 of an example method of game token management, according to example embodiments. Referring to FIG. 4A, the method 400 may include one or more of the steps described below.

FIG. 4A illustrates a flow chart of an example method executed by the token manager node 102 (see FIG. 1B). It should be understood that method 400 depicted in FIG. 4A may include additional operations and that some of the operations described therein may be removed and/or modified without departing from the scope of the method 400. The description of the method 400 is also made with reference to the features depicted in FIG. 1B for purposes of illustration. Particularly, the processor 104 of the token manager node 102 may execute some or all of the operations included in the method 400.

With reference to FIG. 4A, at block 412, the processor 104 may receive a registration request containing user IP address and a wallet from the at least one player node off-chain. At block 414, the processor 104 may map a transaction over the blockchain network with users' database based on the IP address. At block 416, the processor 104 may assign a user role to the wallet, wherein the user role allows the at least one player node to buy game tokens from a liquidity pool over the blockchain network. At block 418, the processor 104 may execute a smart contract to add a safe balance to the at least one player node based on the user role. At block 420, the processor 104 may intercept a transaction for selling at least one game token to a target player node to validate the safe balance of the player node. At block 422, the processor 104 may allow the transaction responsive to a validation.

Figure 4B:
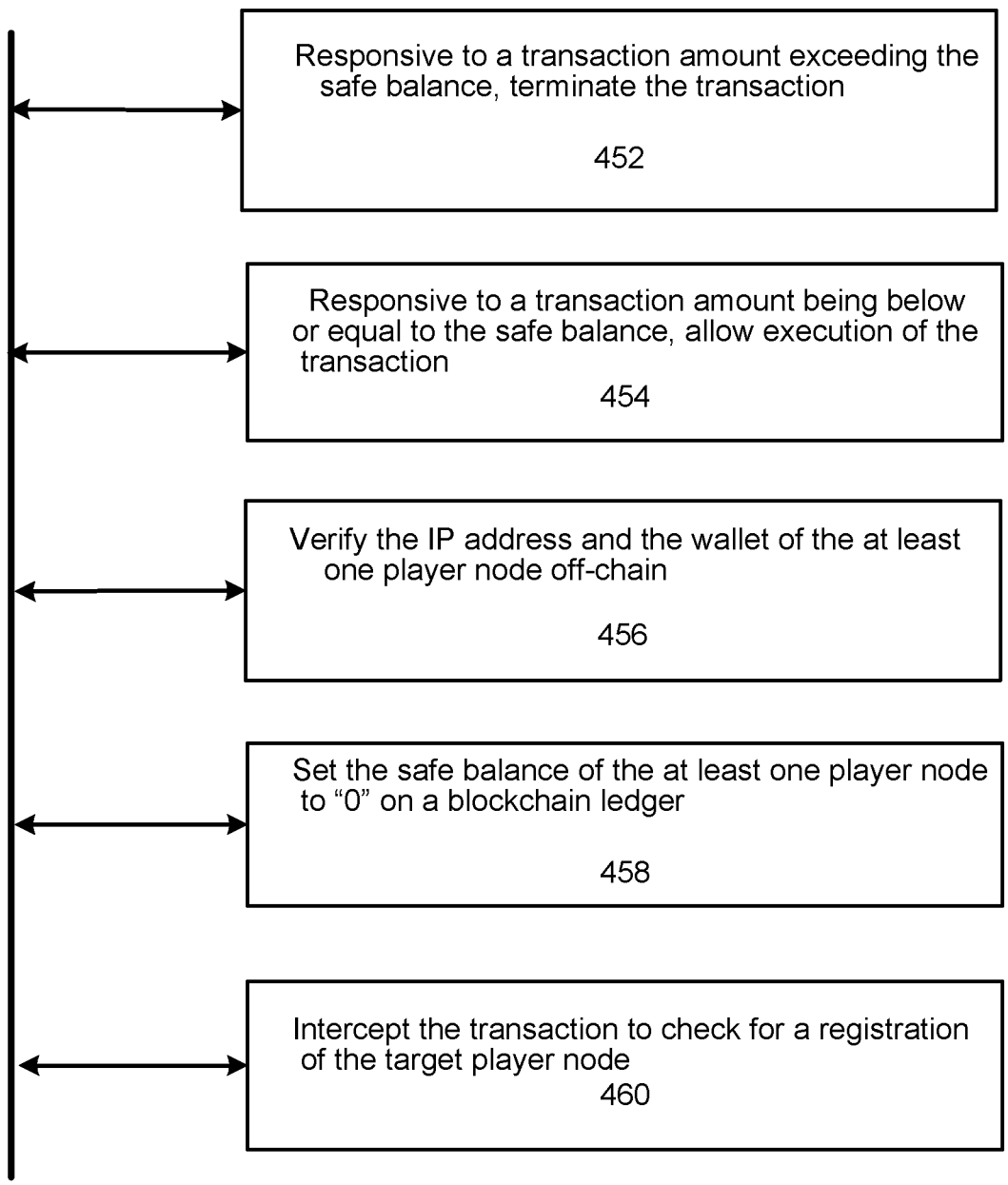
FIG. 4B illustrates a further flow diagram of a method of token sale protection, according to example embodiments.

FIG. 4B illustrates a further flow diagram 450 of an example method of game token management, according to example embodiments. Referring to FIG. 4B, the method 450 may include one or more of the steps described below.

FIG. 4B illustrates a flow chart of an example method executed by the token manager node 102 (see FIG. 1B). It should be understood that method 450 depicted in FIG. 4B may include additional operations and that some of the operations described therein may be removed and/or modified without departing from the scope of the method 450. The description of the method 450 is also made with reference to the features depicted in FIG. 1B for purposes of illustration. Particularly, the processor 104 of the token manager node 102 may execute some or all of the operations included in the method 450.

With reference to FIG. 4B, at block 452, the processor 104 may, responsive to a transaction amount exceeding the safe balance, terminate the transaction. At block 454, the processor 104 may responsive to a transaction amount being below or equal to the safe balance, allow execution of the transaction. At block 456, the processor 104 may verify the IP address and the wallet of the at least one player node off-chain. At block 458, the processor 104 may set the safe balance of the at least one player node to "0" on a blockchain ledger. At block 460, the processor 104 may intercept the transaction to check for a registration of the target player node.

As discussed above, transferring of the at least one token to the target player node reduces the safe balance of the at least one player node while a safe balance of the target player node remains unchanged.

Figure 5A:
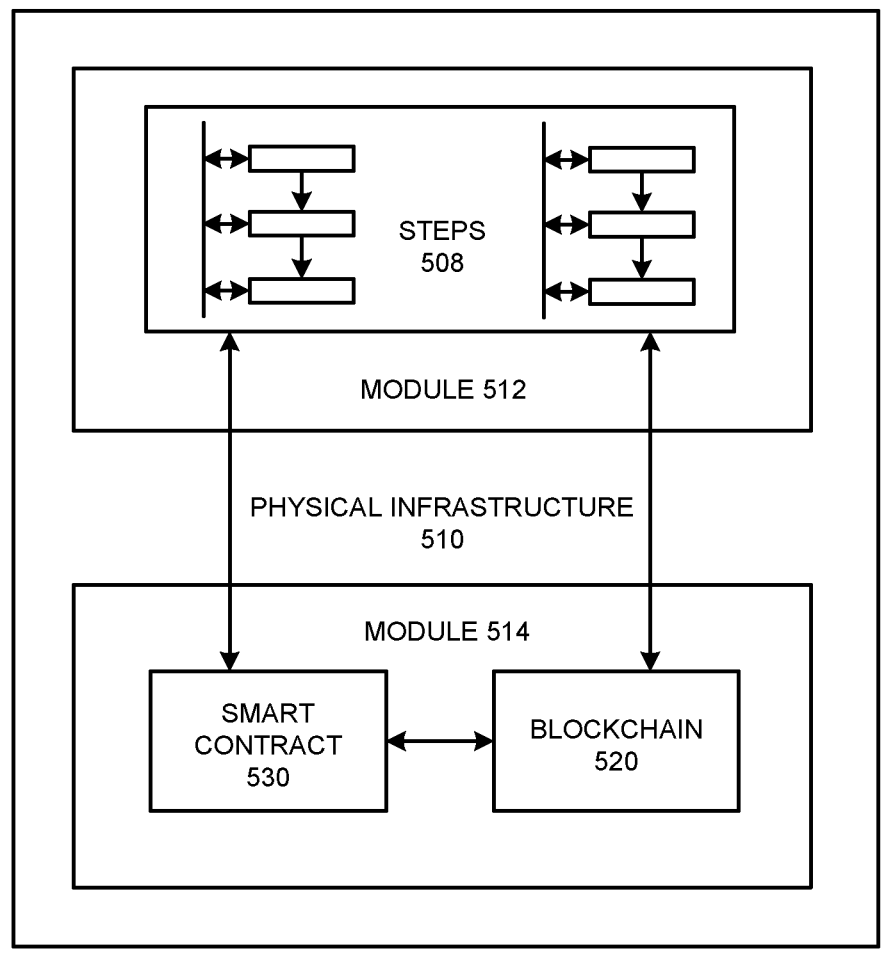
FIG. 5A illustrates an example system configured to perform one or more operations described herein, according to example embodiments.

FIG. 5A illustrates an example system 500 that includes a physical infrastructure 510 configured to perform various operations according to example embodiments. Referring to FIG. 5A, the physical infrastructure 510 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical infrastructure 510, the module 512, and the module 514 may include one or more computers, servers, processors, memories, and/or wireless communication devices. Further, the module 512 and the module 514 may be a same module.

Figure 5B:
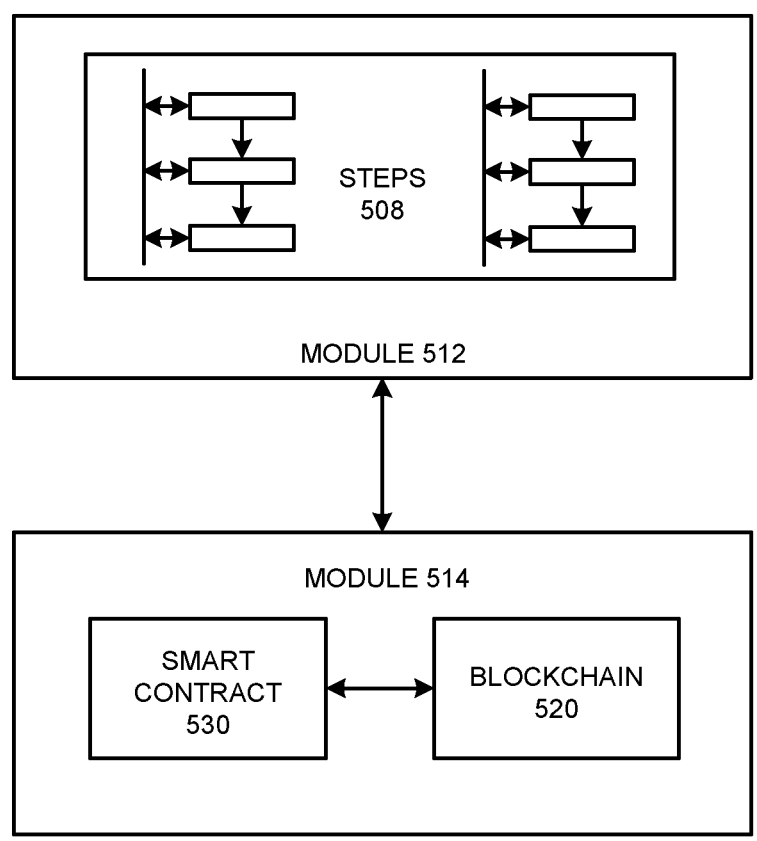
FIG. 5B illustrates another example system configured to perform one or more operations described herein, according to example embodiments.

FIG. 5B illustrates another example system 540 configured to perform various operations according to example embodiments. Referring to FIG. 5B, the system 540 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical infrastructure 510, the module 512, and the module 514 may include one or more computers, servers, processors, memories, and/or wireless communication devices. Further, the module 512 and the module 514 may be a same module.

Figure 5C:
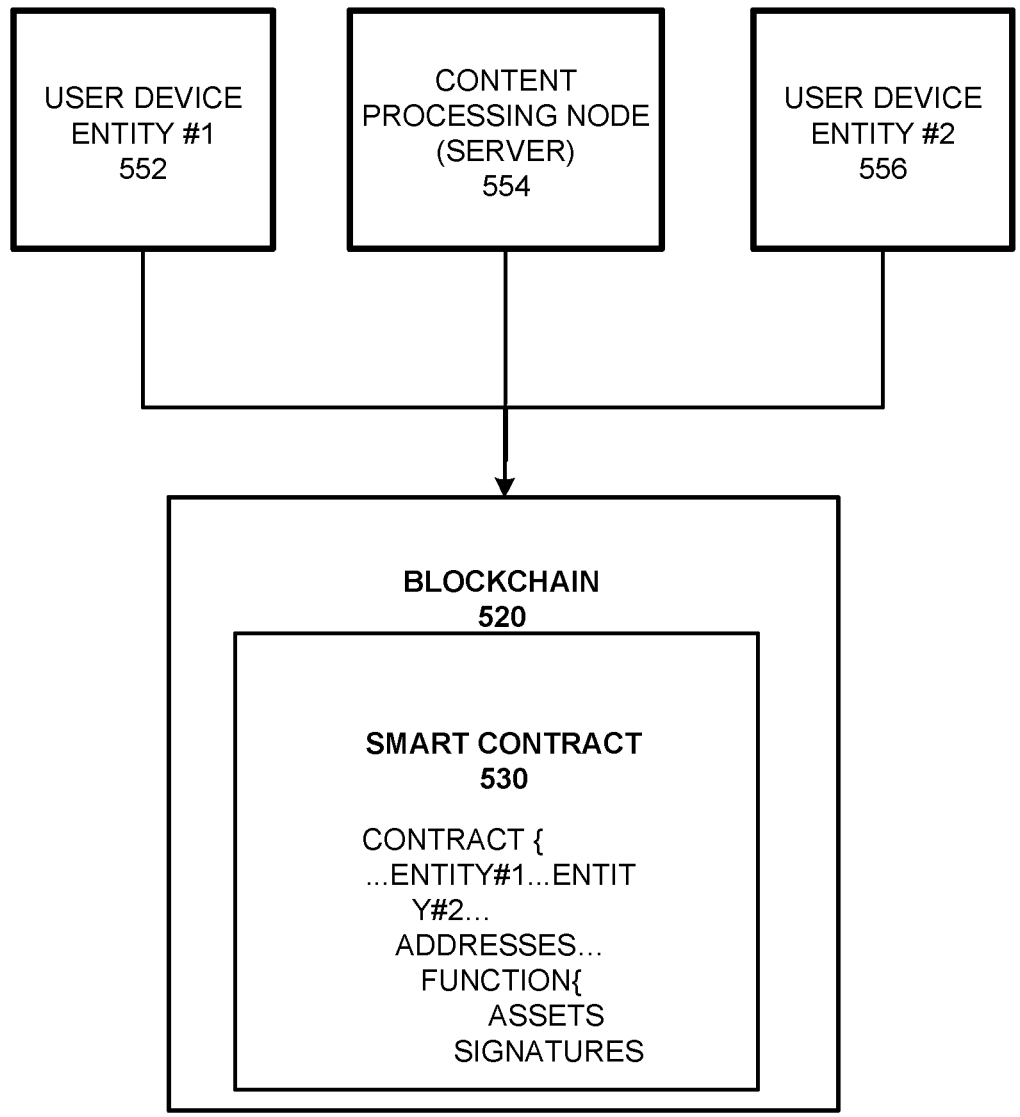
FIG. 5C illustrates a further example system configured to utilize a smart contract, according to example embodiments.

FIG. 5C illustrates an example system configured to utilize a smart contract configuration among contracting parties and a mediating server configured to enforce the smart contract terms on the blockchain according to example embodiments. Referring to FIG. 5C, the configuration 550 may represent a communication session, an asset (e.g., NFT) transfer session or a process or procedure that is driven by a smart contract 530 which explicitly identifies one or more user devices 552 and/or 556. The execution, operations and results of the smart contract execution may be managed by the NFT processing node (e.g., a server) 554. Content of the smart contract 530 may require digital signatures by one or more of the entities 552 and 556 which are parties to the smart contract transaction. The results of the smart contract execution may be written to a blockchain 520 as a blockchain transaction. The smart contract 530 resides on the blockchain 520 which may reside on one or more computers, servers, processors, memories, and/or wireless communication devices.

Figure 5D:
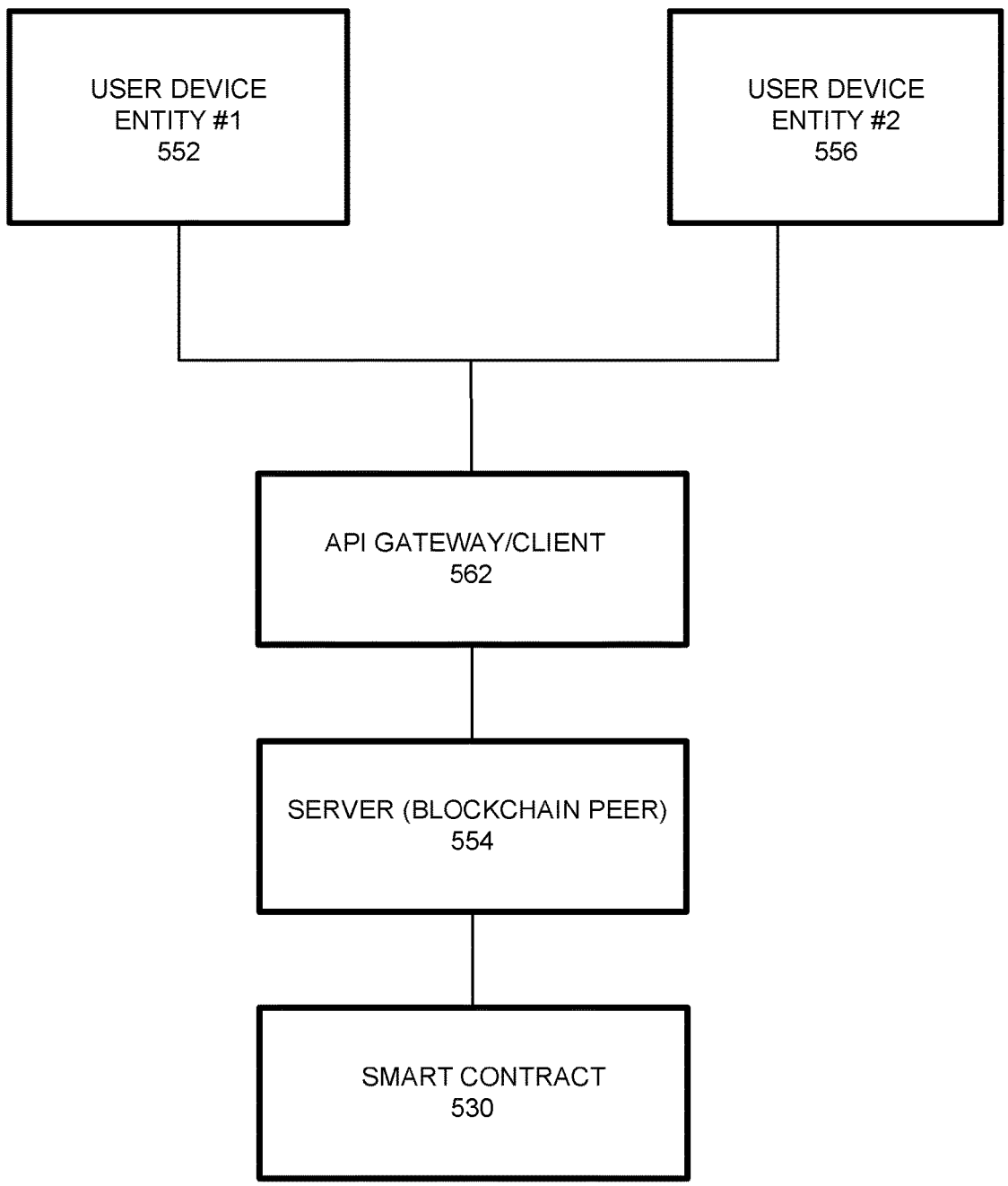
FIG. 5D illustrates yet another example system configured to utilize a blockchain, according to example embodiments.

FIG. 5D illustrates a system 560 including a blockchain, according to example embodiments. Referring to the example of FIG. 5D, an application programming interface (API) gateway 562 provides a common interface for accessing blockchain logic (e.g., smart contract 530 or other chaincode) and data (e.g., distributed ledger, etc.). In this example, the API gateway 562 is a common interface for performing transactions (invoke, queries, etc.) on the blockchain by connecting one or more entities 552 and 556 to a blockchain peer (i.e., server 554). Here, the server 554 is a blockchain network peer component that holds a copy of the world state and a distributed ledger allowing clients 552 and 556 to query data on the world state as well as submit transactions into the blockchain network where, depending on the smart contract 530 and endorsement policy, endorsing peers will run the smart contracts 530.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 6:
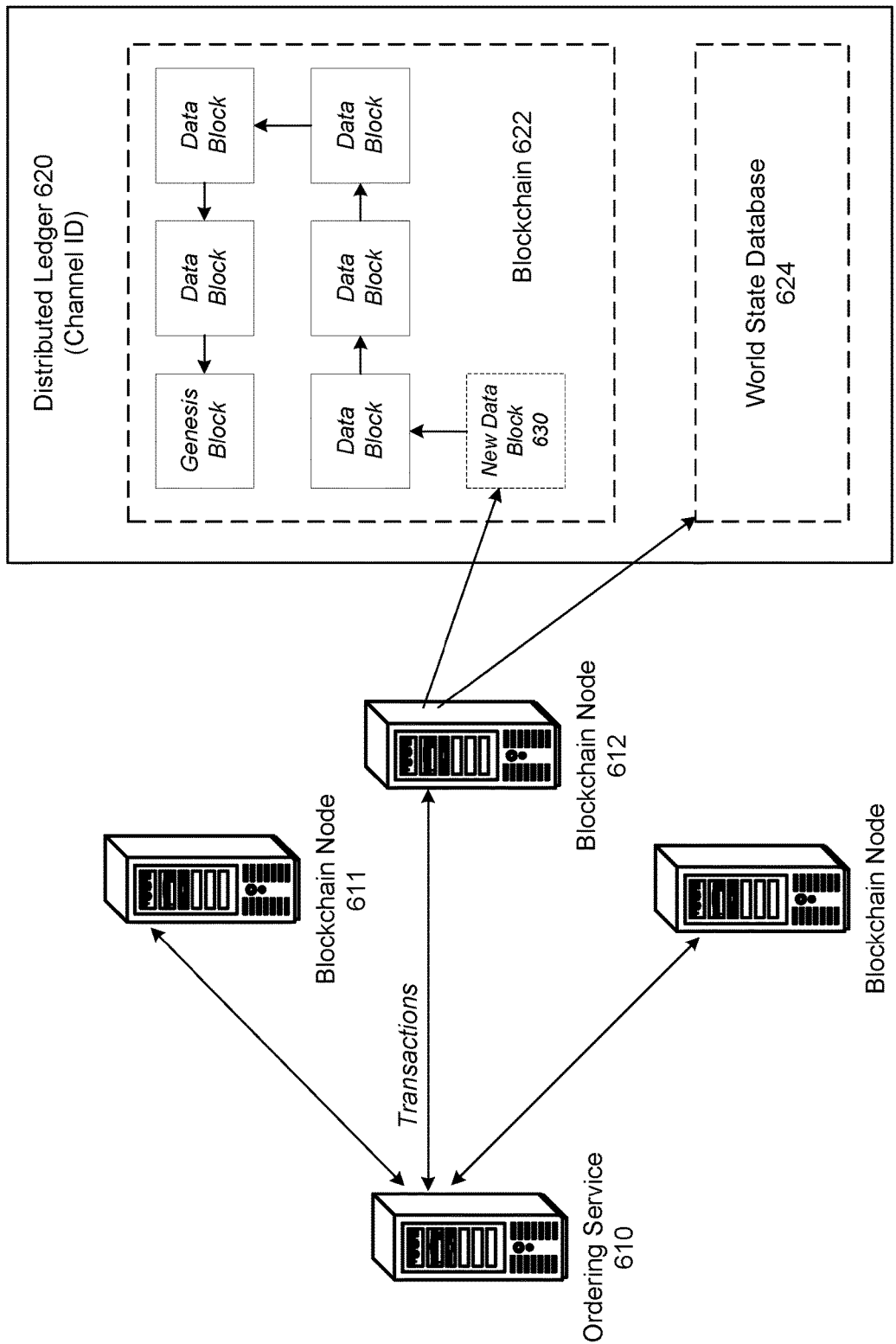
FIG. 6 illustrates a process for a new block being added to a distributed ledger, according to example embodiments.

FIG. 6 illustrates a process 600 of a new block being added to a distributed ledger 620, according to example embodiments. Referring to FIG. 6, clients (not shown) may submit transactions to blockchain nodes 611, 612, and/or 613. Clients may be instructions received from any source to enact activity on the blockchain 620. As an example, the clients may be applications that act on behalf of a requester, such as a device, person or entity to propose transactions for the blockchain. The plurality of blockchain peers (e.g., blockchain nodes 611, 612, and 613) may maintain a state of the blockchain network and a copy of the distributed ledger 620. Different types of blockchain nodes/peers may be present in the blockchain network including endorsing peers which simulate and endorse transactions proposed by clients and committing peers which verify endorsements, validate transactions, and commit transactions to the distributed ledger 620. In this example, the blockchain nodes 611, 612, and 613 may perform the role of endorser node, committer node, or both.

The distributed ledger 620 includes a blockchain which stores immutable, sequenced records in blocks, and a state database 624 (current world state) maintaining a current state of the blockchain 622. One distributed ledger 620 may exist per channel and each peer maintains its own copy of the distributed ledger 620 for each channel of which they are a member. The blockchain 622 is a transaction log, structured as hash-linked blocks where each block contains a sequence of N transactions. The linking of the blocks (shown by arrows) may be generated by adding a hash of a prior block's header within a block header of a current block. In this way, all transactions on the blockchain 622 are sequenced and cryptographically linked together preventing tampering with blockchain data without breaking the hash links. Furthermore, because of the links, the latest block in the blockchain 622 represents every transaction that has come before it. The blockchain 622 may be stored on a peer file system (local or attached storage), which supports an append-only blockchain workload.

The current state of the blockchain 622 and the distributed ledger 620 may be stored in the state database 624. Here, the current state data represents the latest values for all keys ever included in the chain transaction log of the blockchain 622. Chaincode invocations execute transactions against the current state in the state database 624. To make these chaincode interactions extremely efficient, the latest values of all keys are stored in the state database 624. The state database 624 may include an indexed view into the transaction log of the blockchain 622, it can therefore be regenerated from the chain at any time. The state database 624 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 610.

The ordering service 610 accepts endorsed transactions, orders them into a block, and delivers the blocks to the committing peers. For example, the ordering service 610 may initiate a new block when a threshold of transactions has been reached, a timer times out, or another condition. In the example depicted in FIG. 6, blockchain node 612 is a committing peer that has received a new data new data block 630 for storage on blockchain 620. The first block in the blockchain may be referred to as a genesis block which includes information about the blockchain, its members, the data stored therein, etc.

The ordering service 610 may be made up of a cluster of orderers. The ordering service 610 does not process transactions, smart contracts, or maintain the shared ledger. Rather, the ordering service 610 may accept the endorsed transactions and specifies the order in which those transactions are committed to the distributed ledger 620. The architecture of the blockchain network may be designed such that the specific implementation of 'ordering' (e.g., Solo, Kafka, BFT, etc.) becomes a pluggable component.

Transactions are written to the distributed ledger 620 in a consistent order. The order of transactions is established to ensure that the updates to the state database 624 are valid when they are committed to the network. Unlike a cryptocurrency blockchain system (e.g., Bitcoin, etc.) where ordering occurs through the solving of a cryptographic puzzle, or mining, in this example the parties of the distributed ledger 620 may choose the ordering mechanism that best suits that network.

When the ordering service 610 initializes a new data block 630, the new data block 630 may be broadcast to committing peers (e.g., blockchain nodes 611, 612, and 613). In response, each committing peer validates the transaction within the new data block 630 by checking to make sure that the read set and the write set still match the current world state in the state database 624. Specifically, the committing peer can determine whether the read data that existed when the endorsers simulated the transaction is identical to the current world state in the state database 624. When the committing peer validates the transaction, the transaction is written to the blockchain 622 on the distributed ledger 620, and the state database 624 is updated with the write data from the read-write set. If a transaction fails, that is, if the committing peer finds that the read-write set does not match the current world state in the state database 624, the transaction ordered into a block will still be included in that block, but it will be marked as invalid, and the state database 624 will not be updated.

Figure 7:
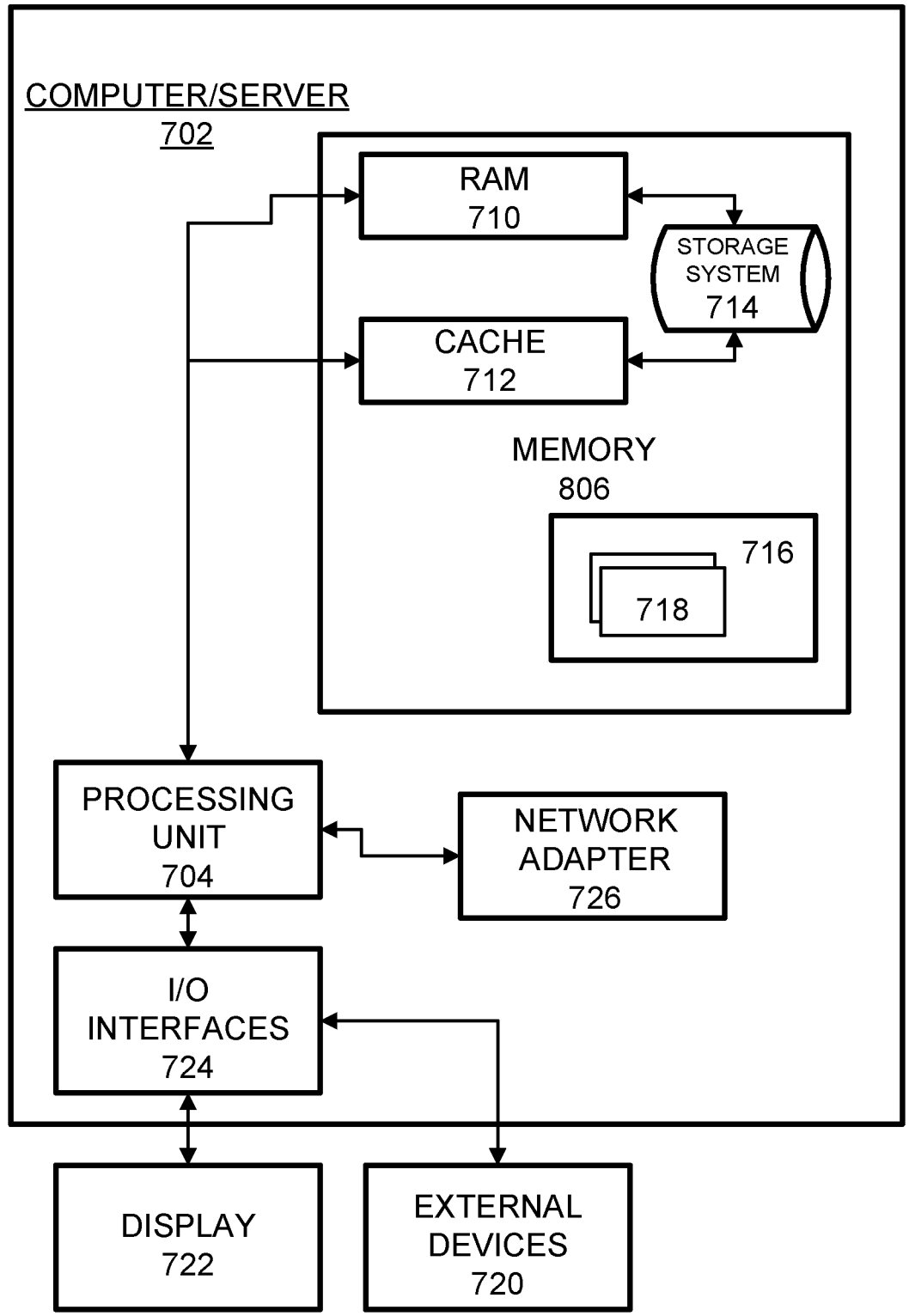
FIG. 7 illustrates an example token processing node that supports one or more of the example embodiments.

FIG. 7 illustrates an example token manager node 700 that supports one or more of the example embodiments described and/or depicted herein. The token manager node 700 comprises a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in the token manager node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system for managing tokens, comprising:
   a processor of a token manager node connected to at least one player node over a blockchain network;
   a memory on which are stored machine-readable instructions that when executed by the processor, cause the processor to:
   receive a registration request containing user IP address and a wallet from the at least one player node off-chain;
   map a transaction over the blockchain network with a users' database based on the IP address;
   assign a user role to the wallet of the at least one player node, wherein the user role allows the at least one player node to buy game tokens from a liquidity pool over the blockchain network;
   execute a smart contract on the blockchain network to add a safe balance to the at least one player node based on the assigned user role, wherein the safe balance indicates an amount of game tokens a user of the at least one player node is allowed to sell;
   intercept a blockchain transaction for selling at least one game token by the at least one player node to a target player node to validate the safe balance of the at least one player node; and
   allow the blockchain transaction responsive to a validation of the safe balance.

2. The system of claim 1, wherein the instructions further cause the processor to, responsive to a transaction amount exceeding the safe balance, terminate the transaction.

3. The system of claim 1, wherein the instructions further cause the processor to, responsive to a transaction amount being below or equal to the safe balance, allow execution of the transaction.

4. The system of claim 1, wherein the instructions further cause the processor to verify the IP address and the wallet of the at least one player node off-chain.

5. The system of claim 1, wherein the instructions further cause the processor to set the safe balance of the at least one player node to "0" on a blockchain ledger.

6. The system of claim 1, wherein the instructions further cause the processor to intercept the transaction to check for a registration of the target player node.

7. The system of claim 1, wherein transferring of the at least one token to the target player node reduces the safe balance of the at least one player node, and wherein a safe balance of the target player node remains unchanged.

8. A method for managing tokens, comprising:
   receiving, by a token manager node, a registration request containing user IP address and a wallet from an at least one player node off-chain;
   mapping, by the token manager node, a transaction over a blockchain network with a users' database based on the IP address;
   assigning, by the token manager node, a user role to the wallet of the at least one player node, wherein the user role allows the at least one player node to buy game tokens from a liquidity pool over the blockchain network;
   executing, by the token manager node, a smart contract on the blockchain network to add a safe balance to the at least one player node based on the assigned user role, wherein the safe balance indicates an amount of game tokens a user of the at least one player node is allowed to sell;
   intercepting, by the token manager node, a blockchain transaction for selling at least one game token by the at least one player node to a target player node to validate the safe balance of the at least one player node; and
   allowing the blockchain transaction responsive to a validation of the safe balance.

9. The method of claim 8, further comprising, responsive to a transaction amount exceeding the safe balance, terminating the transaction.

10. The method of claim 8, further comprising, responsive to a transaction amount being below or equal to the safe balance, allowing execution of the transaction.

11. The method of claim 8, further comprising verifying the IP address and the wallet of the at least one player node off-chain.

12. The method of claim 8, further comprising setting the safe balance of the at least one player node to "0" on a blockchain ledger.

13. The method of claim 8, further comprising intercepting the transaction to check for a registration of the target player node.

14. The method of claim 8, wherein transferring of the at least one token to the target player node reduces the safe balance of the at least one player node, and wherein a safe balance of the target player node remains unchanged.

15. A non-transitory computer readable medium comprising instructions, that when read by a processor, cause the processor to perform:
   receiving a registration request containing user IP address and a wallet from an at least one player node off-chain;
   mapping a transaction over a blockchain network with a users' database based on the IP address;
   assigning a user role to the wallet of the at least one player node, wherein the user role allows the at least one player node to buy game tokens from a liquidity pool over the blockchain network;
   executing a smart contract on the blockchain network to add a safe balance to the at least one player node based on the assigned user role, wherein the safe balance indicates an amount of game tokens a user of the at least one player node is allowed to sell;
   intercepting a blockchain transaction for selling at least one game token by the at least one player node to a target player node to validate the safe balance of the at least one player node; and
   allowing the blockchain transaction responsive to a validation of the safe balance.

16. The non-transitory computer readable medium of claim 15, further comprising instructions, that when read by the processor, cause the processor to, responsive to a transaction amount exceeding the safe balance, terminate the transaction.

17. The non-transitory computer readable medium of claim 15, further comprising instructions, that when read by the processor, cause the processor to, responsive to a transaction amount being below or equal to the safe balance, allow execution of the transaction.

18. The non-transitory computer readable medium of claim 15, further comprising instructions, that when read by the processor, cause the processor to verify the IP address and the wallet of the at least one player node off-chain.

19. The non-transitory computer readable medium of claim 15, further comprising instructions, that when read by the processor, cause the processor to intercept the transaction to check for a registration of the target player node.

20. The non-transitory computer readable medium of claim 15, wherein transferring of the at least one token to the target player node reduces the safe balance of the at least one player node, and wherein a safe balance of the target player node remains unchanged.

* * * * *